United States Patent
Nomura

(10) Patent No.: US 10,235,610 B2
(45) Date of Patent: Mar. 19, 2019

(54) IMAGE PROCESSING APPARATUS WHICH CORRECTS A GRAY LEVEL OF EACH PIXEL IN IMAGE DATA, IMAGE FORMING APPARATUS AND COMPUTER-READABLE MEDIUM

(71) Applicant: KONICA MINOLTA, INC., Chiyoda-ku, Tokyo (JP)

(72) Inventor: Shoichi Nomura, Machida (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 8 days.

(21) Appl. No.: 15/701,816

(22) Filed: Sep. 12, 2017

(65) Prior Publication Data
US 2018/0074431 A1 Mar. 15, 2018

(30) Foreign Application Priority Data
Sep. 14, 2016 (JP) ................ 2016-179180

(51) Int. Cl.
| | | |
|---|---|---|
| G03G 15/04 | (2006.01) | |
| H04N 1/00 | (2006.01) | |
| G06K 15/00 | (2006.01) | |
| G06K 15/12 | (2006.01) | |
| H04N 1/58 | (2006.01) | |
| G03G 15/043 | (2006.01) | |

(52) U.S. Cl.
CPC ....... *G06K 15/1261* (2013.01); *G03G 15/043* (2013.01); *H04N 1/58* (2013.01)

(58) Field of Classification Search
CPC ...... G03G 15/011; G03G 15/043; H04N 1/58; G06K 15/1247; G06K 15/1261; G06K 15/1209; G06K 15/1214
USPC ............ 399/4, 51; 358/2.1, 3.01, 3.02, 3.03, 358/3.27; 347/233
See application file for complete search history.

(56) References Cited

U.S. PATENT DOCUMENTS

| | | | | |
|---|---|---|---|---|
| 6,236,466 B1 * | 5/2001 | Chung | ................ | H04N 1/4055 358/1.9 |
| 7,400,766 B1 * | 7/2008 | Dominguez | ......... | G06K 9/4609 358/462 |
| 9,299,163 B2 * | 3/2016 | Wu | ........................... | G06T 5/20 |
| 2016/0155244 A1 * | 6/2016 | Kakuta | ................. | G06T 11/001 382/162 |

FOREIGN PATENT DOCUMENTS

| | | |
|---|---|---|
| JP | 10-193676 A | 7/1998 |
| JP | 2000-238329 A | 9/2000 |

(Continued)

*Primary Examiner* — Robert B Beatty
(74) *Attorney, Agent, or Firm* — Buchanan Ingersoll & Rooney PC

(57) ABSTRACT

An image processing apparatus includes a beam corrector which corrects a gray level of each pixel in image data so as to reduce a density difference due to a misalignment in beam position of laser beams of a multibeam array. The beam corrector includes a calculator which detects an edge of an object between a pixel and adjacent pixels of the pixel in the image data and calculates an edge intensity of the edge. The calculator calculates a corrected gray level of the pixel from the calculated edge intensity and a correction value corresponding to a deviation in beam position of the laser beams emitted according to a gray level of the pixel.

18 Claims, 14 Drawing Sheets

(56) References Cited

FOREIGN PATENT DOCUMENTS

| JP | 2009-118378 A | | 5/2009 |
|---|---|---|---|
| JP | 2010136036 A | * | 6/2010 |
| JP | 2011239090 A | * | 11/2011 |
| JP | 2015-100920 A | | 6/2015 |
| JP | 2015177362 A | * | 10/2015 |

* cited by examiner

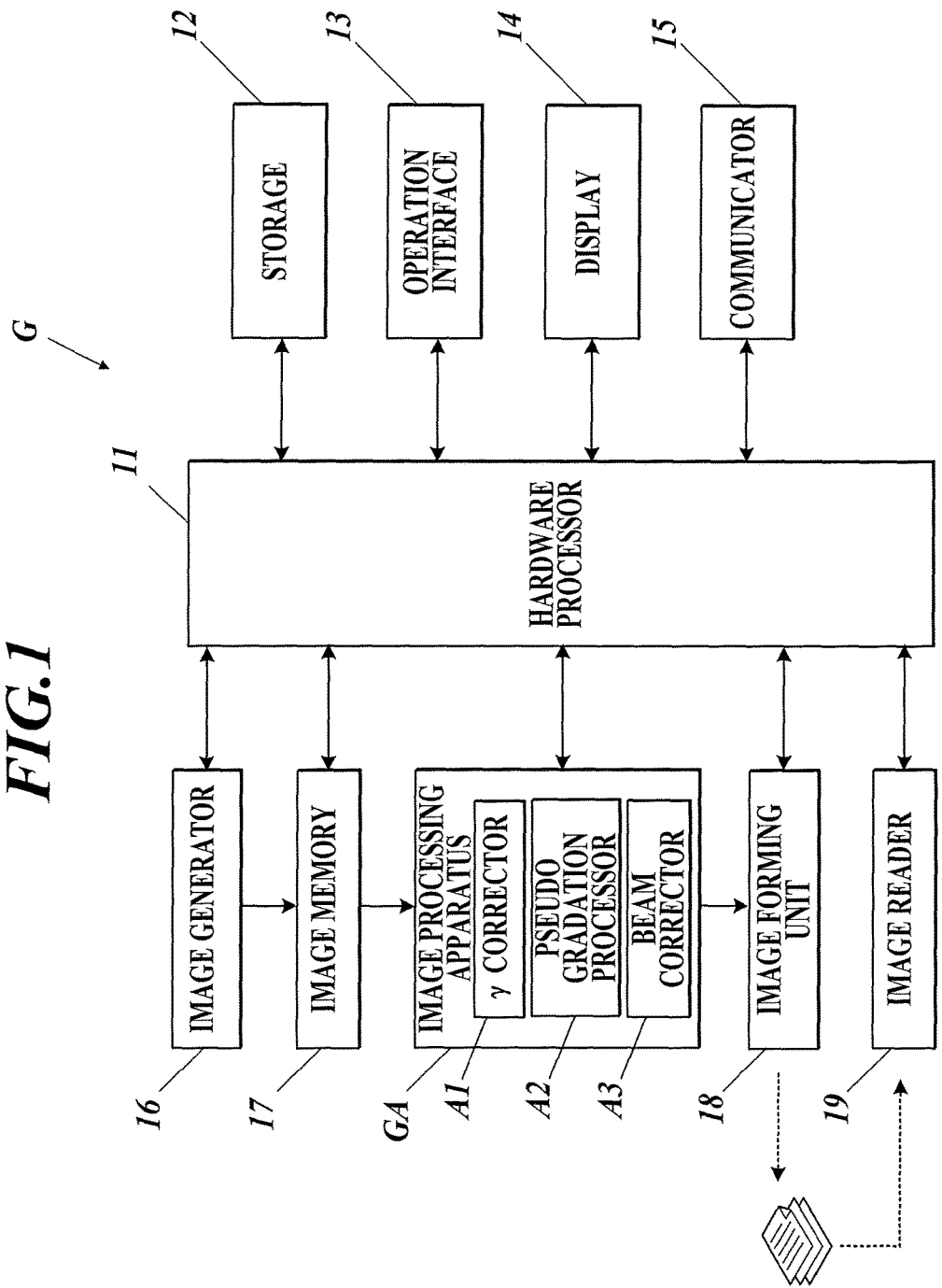

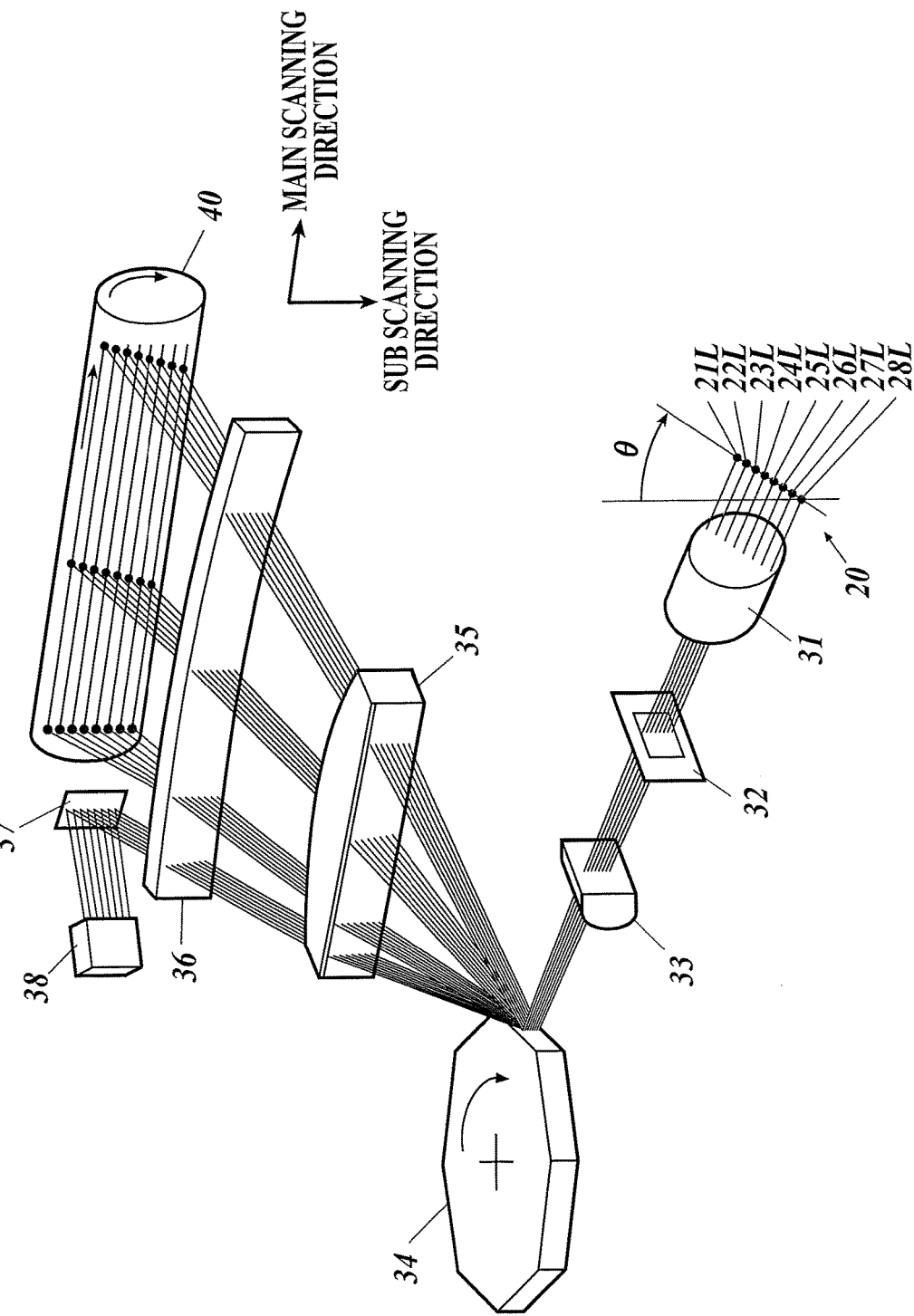

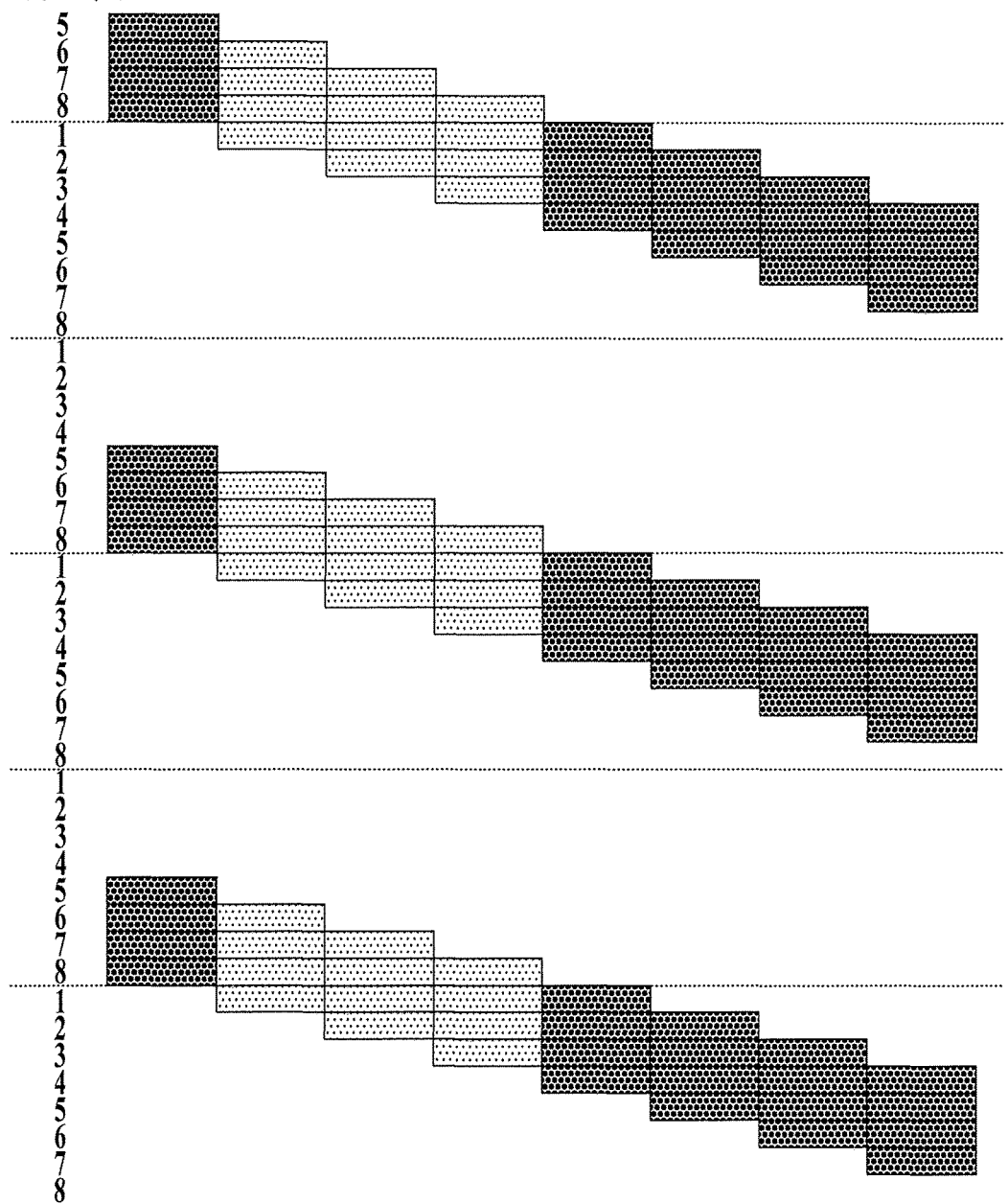

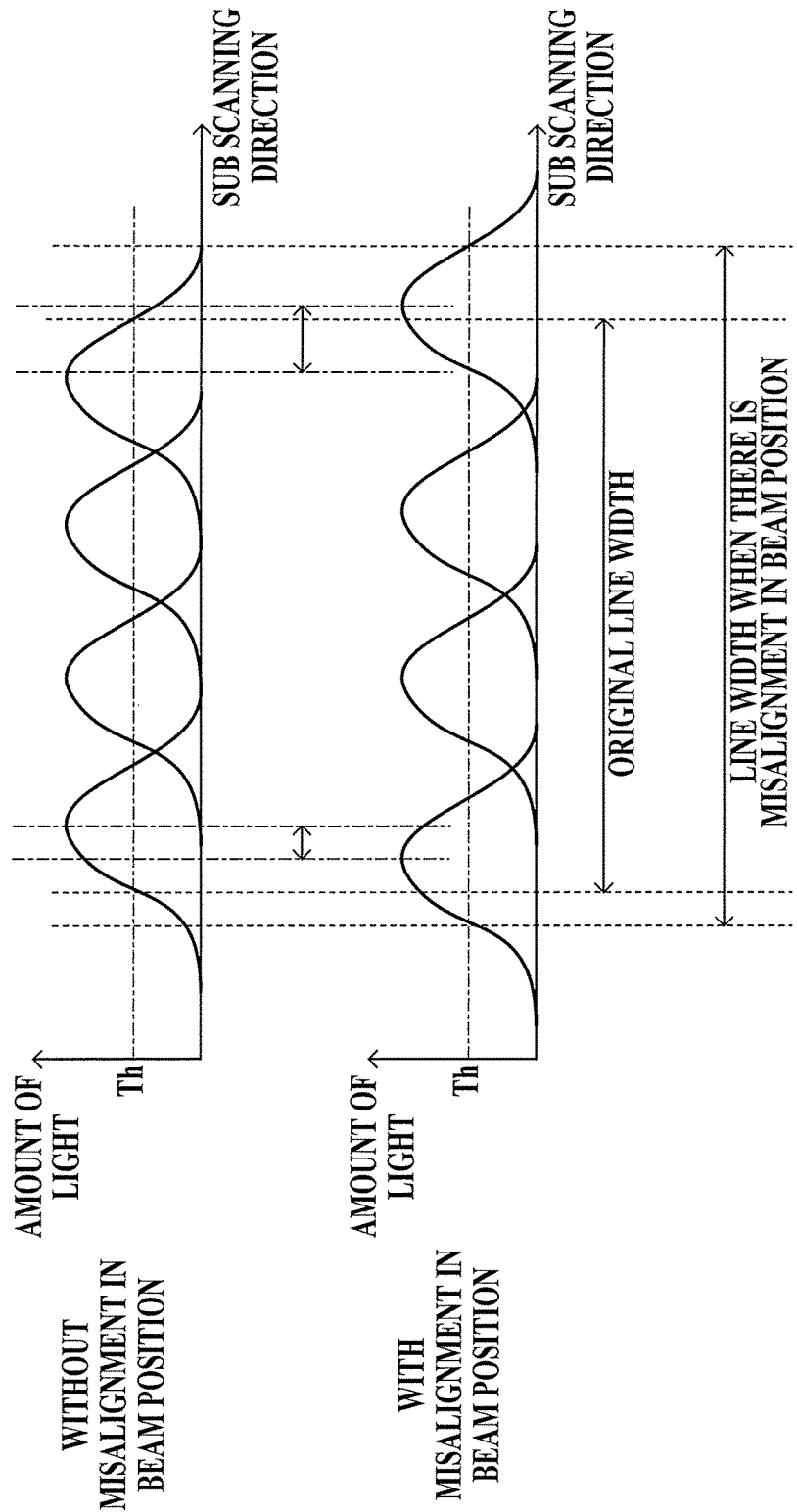

IMAGE PROCESSING APPARATUS WHICH CORRECTS A GRAY LEVEL OF EACH PIXEL IN IMAGE DATA, IMAGE FORMING APPARATUS AND COMPUTER-READABLE MEDIUM

BACKGROUND

1. Technological Field

The present invention relates to an image processing apparatus, an image forming apparatus and a computer-readable medium.

2. Description of the Related Art

Electrophotographic image forming apparatuses form an image by scanning and exposing the surface of a photoreceptor with a laser beam that is modulated according to the gray level of each pixel in image data and developing the electrostatic latent image formed by the exposure.

To speed up the image formation, some image forming apparatuses known in the art use a plurality of laser beams to scan a photoreceptor in parallel and forms plural lines of an image with respect to each scan. Such a plurality of laser beams for parallel scan is known as a multibeam array.

To form an image by means of a multibeam array, it is preferred that the spacing between the laser beams is maintained at a constant distance. In practice, the laser beams may however sometimes be misaligned due to an adjustment error in the production, the lapse of time, an environmental change and the like, which affects the image quality.

For example, when a line image is formed, a misalignment in the beam position may cause a fluctuation of the line width. Since the density of a line image is proportional to the line width, a difference in the line width causes a difference in the density.

Although such a change of the line width due to a misalignment in the beam position is very small, it can occur periodically in a ladder pattern chart or the like. In this case, the density difference between areas with the changed line width and the other area with the unchanged line width appears regularly, which is observed as an undesirable Moire pattern.

An adjustment that has been made for maintaining the original line width is to increase the amount of exposure in the contour pixels of a text or a graphic when the beam spacing is expanded, and to decrease the amount of exposure in such pixels when the beam spacing is narrowed (e.g. see JP 2000-238329A). Another technique for reducing uneven density bands is to repeatedly scan and expose the same main scanning line for multiple times while changing pixels to be exposed with respect to each scan so that the exposure pattern is changed from a band shape to an uneven shape (e.g. see JP H10-193676A). Yet another technique that has also been proposed for reproducing an original line width is to linearly interpolate the gray level between adjacent pixels in the sub scanning direction according to the amount of positional deviation of the laser beams of a multibeam array (e.g. see JP 2015-100920A).

Since the change of density of a text, a graphic and the like is greatly affected by the misalignment in the beam position at the contour thereof, it is possible to avoid unnecessary correction by performing a correction only when there is a misalignment in the beam position at the contour of an image. However, changing the process depending on the condition may sometimes complicate the processing and deteriorate the smoothness of the image due to the unstable correction.

SUMMARY

It is an object of the present invention to perform stable correction by a uniform process.

To achieve at least one of the abovementioned objects, according to an aspect of the present invention, there is provided an image processing apparatus, including:

a beam corrector which corrects a gray level of each pixel in image data so as to reduce a density difference due to a misalignment in beam position of laser beams of a multibeam array, wherein the beam corrector includes a calculator which detects an edge of an object between a pixel and adjacent pixels of the pixel in the image data and calculates an edge intensity of the edge, and wherein the calculator calculates a corrected gray level of the pixel from the calculated edge intensity and a correction value corresponding to a deviation in beam position of the laser beams emitted according to a gray level of the pixel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 1 is a block diagram illustrating the functional configuration of an image forming apparatus according to an embodiment of the present invention;

FIG. 2 is a perspective view illustrating the schematic configuration of an exposer that performs a scan with a multibeam array;

FIG. 4 is a ladder pattern chart in which the density is partly decreased due to the narrowed spacing between multibeam arrays;

FIG. 5 illustrates the light amount distribution in the conditions with and without a misalignment in the beam position of laser beams;

DETAILED DESCRIPTION OF EMBODIMENTS

Figure 3A:
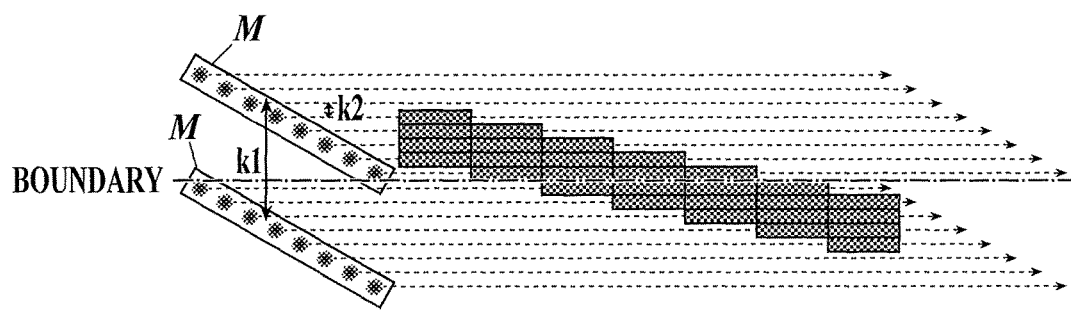
FIG. 3A illustrates an example of a diagonal line image that is formed by means of multibeam arrays with constant beam spacing.

Hereinafter, one or more embodiments of the present invention will be described with reference to the drawings. However, the scope of the invention is not limited to the disclosed embodiments.

FIG. 1 illustrates the functional configuration of an image forming apparatus G according to an embodiment of the present invention.

As illustrated in FIG. 1, the image forming apparatus G includes a hardware processor 11, a storage 12, an operation interface 13, a display 14, a communicator 15, an image generator 16, an image memory 17, an image processing apparatus GA, an image forming unit 18 and an image reader 19.

The hardware processor 11 includes a CPU (Central Processing Unit), a RAM (Random Access Memory) and the like. The hardware processor 11 reads out a variety of programs from the storage 12 to control the components.

For example, the hardware processor 11 makes the image processing apparatus GA perform image processing on image data that is generated by the image generator 16 and stored in the image memory 17, and then makes the image forming unit 18 form an image on a sheet based on the processed image data.

The storage 12 stores programs, files to be used for execution of the programs and the like, which are readable by the hardware processor 11. The storage 12 may be constituted by a high-capacity memory such as a hard disk drive or the like.

The operation interface 13 generates an operation signal according to a user operation and outputs it to the hardware processor 11. The operation interface 13 may be constituted by a keypad, a touch panel integrally formed with the display 14, or the like.

The display 14 displays an operation screen and the like by a control of the hardware processor 11. The display 14 may be constituted by an LCD (Liquid Crystal Display), an OELD (Organic Electro-Luminescence Display) or the like.

The communicator 15 communicates with an external device in a network such as a user terminal, a server, another image forming apparatus or the like.

The communicator 15 receives data (hereinafter referred to as "PDL data") from a user terminal or the like through the network, in which a command to form an image is written in the page description language (PDL).

The image generator 16 rasterizes the PDL data received from the communicator 15 to generate image data in the bitmap format. Each pixel in the image data has gray levels of the four colors of C (cyan), M (magenta), Y (yellow) and K (black). A gray level is a data value representing the density of an image. For example, an 8-bit data value represents a gray level ranging from 0 to 255.

The processing by the image generator 16 may be achieved by software processing in which a processor such as a CPU executes a program for the image generation.

In addition to the image data, the image generator 16 can generate attribute data that represents the attribute of the image data.

For example, the image generator 16 can determine the attribute of the pixels constituting an image of Kana (Japanese character), alphabet, number or the like as "text", which is rendered in the rasterization according to the description of character codes in PDL data. Further, the image generator 16 can determine the attribute of the pixels constituting an image of polygon, circle, ruled line or the like as "graphic", which is rendered according to the description in a vector format such as DXF, SVG or WMF, and the attribute of the pixels constituting an image of photograph or the like rendered based on a JPEG file or the like as "image".

The image memory 17 is a buffer memory that temporarily holds the image data generated by the image generator 16. The image memory 17 may be constituted by a DRAM (Dynamic RAM) or the like.

At the timing of forming an image, the image processing apparatus GA reads out the image data of a corresponding page from the image memory 17 and performs image processing on the image data.

As illustrated in FIG. 1, the image processing apparatus GA includes a γ corrector A1, a pseudo gradation processor A2 and a beam corrector A3.

The γ corrector A1 corrects the gray level of each pixel in the image data so that the density characteristics of an image to be formed on a sheet by the image forming unit 18 correspond to a target density characteristic.

The pseudo gradation processor A2 performs pseudo gradation processing on the image data corrected by the γ corrector A1. For example, the pseudo gradation processing may be error diffusion, screening with a dither matrix, or the like.

When an image of text, line or the like is a binary image, the correction by the beam corrector A3 is particularly effective while such images typically remain the same even by pseudo gradation processing. Accordingly, the attribute data may be input along with the image data, and pixels with an attribute of text or graphic may be excluded from the pseudo gradation processing. Further, when an image of text, line or the like is a multivalued image, the corresponding pixels may also be excluded from the pseudo gradation processing.

The beam corrector A3 corrects the gray level of each pixel in the image data input from the pseudo gradation processor A2 so as to reduce the density difference (uneven density) that is caused by a misalignment in the beam position of the laser beams.

The beam corrector A3 has correction values corresponding to the deviation in the beam position of the respective laser beams in a memory such as resistor.

The image forming unit 18 forms a four-color image on a sheet according to the gray level of the C, M, Y and K four colors of each pixel in the image data that has been processed by the image processing apparatus GA.

Specifically, the image forming unit 18 includes exposers, photoreceptors, developers and the like for the respective colors of C, M, Y and K. The image forming unit 18 emits laser beams by means of the exposers, which are modulated according to the gray levels of each pixel in the image data. The image forming unit 18 scans electrically charged photoreceptors with the laser beams to expose them and supplies toners by means of the developers to develop the electrostatic latent images formed on the photoreceptors. The image forming unit 18 thus sequentially forms respective color images of C, M, Y and K on the respective photoreceptors, and then transfer the images from the photoreceptors onto a transfer body such as an intermediate transfer belt to overlay them thereon (primary transfer). The image forming unit 18 further transfers the color image thus obtained from the transfer body to a sheet (secondary transfer), and heats and presses the sheet to fix the image.

In the exposure, the image forming unit 18 emits multiple beams which are an array of laser beams.

FIG. 2 illustrates the schematic configuration of the exposers that emits multiple beams.

As illustrated in FIG. 2, each of the exposers include a laser light source 20, a collimator lens 31, a slit 32, a cylindrical lens 33, a polygon mirror 34, an fθ lens 35, a cylindrical lens 36, a mirror 37 and a sensor 38.

The laser light source 20 includes eight light emitting elements 21L to 28L. The laser light source 20 operates the respective light emitting elements 21L to 28L in parallel to emit the multiple beams composed of eight laser beams. The multiple beams are converted into parallel beams at the collimator lens 31, shaped into a spot with a predetermined diameter at the slit 32, and then deviated by means of the rotating polygon mirror 34 so that they scan the surface of the photoreceptor 40. The scanning speed on the photoreceptor 40 of the deviated multiple beams is equalized at the fθ lens 35, and the multiple beams are focused on the surface of the photoreceptor 40 by means of the cylindrical lens 36.

For example, the light emitting elements 21L to 28L are constituted by laser diodes. The light emitting elements 21L to 28L are disposed at regular intervals and are inclined at an angle θ with respect to the sub scanning direction. The sub scanning direction refers to the direction perpendicular to the main scanning direction of the laser beams. The image resolution in the sub scanning direction is changeable by adjusting the inclination angle θ of the light emitting elements 21L to 28L to adjust the beam spacing between the laser beams emitted by the respective light emitting elements 21L to 28L.

The image reader 19 scans a sheet on which an image is formed by the image forming unit 18 so as to generate scanned image data in the bitmap format.

For example, the image reader 19 may be constituted by a line sensor, an area sensor or the like.

When an image is formed on a sheet by means of the above-described image forming apparatus G, a misalignment in the beam position of the laser beams of the multibeam array may sometimes causes a change of density in the image.

FIG. 3A illustrates a diagonal line image that is formed when there is no misalignment in the beam position.

When the beam spacing k1 between the multibeam array M and another multibeam array M is constant and the beam spacing k2 between individual laser beams is also constant, i.e. k1/(The number of beams of a multibeam array)=k2 so that the beams are always arranged at regular intervals, it is possible to form the diagonal line image with constant density as illustrated in FIG. 3A.

Figure 3B:
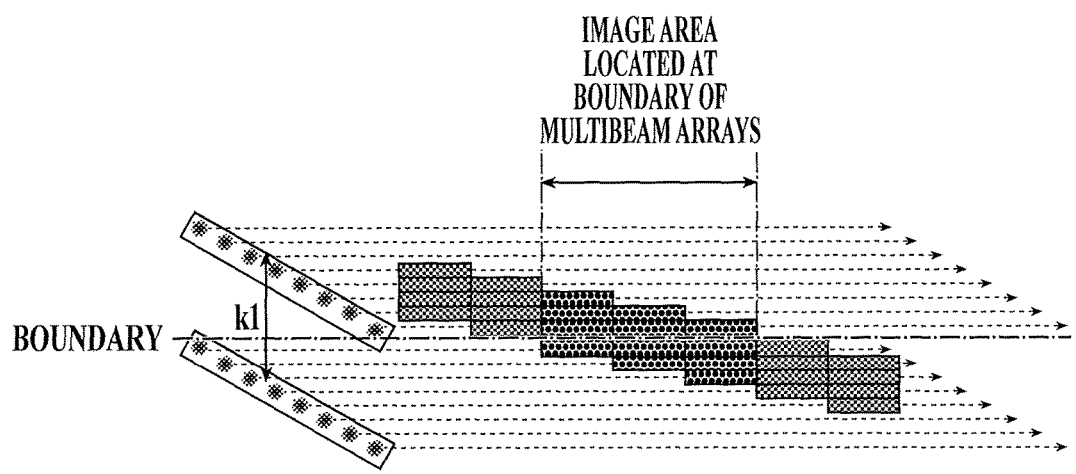
FIG. 3B illustrates a diagonal line image in which the density is partly increased due to the expanded spacing between multibeam arrays.

FIG. 3B illustrates a diagonal line image that is formed when there is a misalignment in the beam position.

When a multibeam array is deviated so that the beam spacing k1 between a multibeam array M and another multibeam array M is expanded, the line width is expanded in the image part on the boundary between the multibeam arrays M, and the image density is increased accordingly as illustrated in FIG. 3B. On the contrary, when the beam spacing k1 is narrowed, the line width is narrowed, and the image density is decreased accordingly.

When only a single diagonal line image is formed, such a local change of density is not noticeable. However, when many diagonal line images are formed at regular intervals, such local changes of density appear periodically, which may sometimes be observed as uneven density like a Moire pattern.

FIG. 4 illustrates an example of the Moire pattern that is caused by the irregular beam spacing between multibeam arrays.

As illustrated in FIG. 4, areas with decreased density due to the narrowed beam spacing between multibeam arrays continuously appear in the vertical direction. The areas with decreased density periodically appear in the diagonal line images, which causes uneven density like a Moire pattern.

In particular, the line width is greatly affected by a misalignment in the beam position of the laser beam that render the contour pixels of a text, a graphic or the like.

FIG. 5 illustrates the light amount distribution of four laser beams when a line image with a width of four pixels is formed with the four laser beams.

As described above, in electrophotography, the laser beams scan the photoreceptor 40 to change the surface electric potential so as to allow toner to adhere to the surface, in which the amount of toner attached is proportional to the amount of light of the laser beams. Since at least a certain amount Th of light is required for changing the surface electric potential to allow the toner to adhere, a toner image is formed in the area where the amount of light is greater than the certain amount Th. In FIG. 5, the certain amount Th of light is illustrated by a dashed-dotted line.

As illustrated in FIG. 5, the width of the image area where the amount of light is greater than the certain amount Th is different depending on whether there is a misalignment in the beam position or there is no misalignment in the beam position and the beam spacing is constant. Therefore, the line width of the line image is fluctuated. In the example of FIG. 5, the line is bolded since the beam position of the laser beams that render the contour of the line image is deviated outward. On the contrary, when the beam position is deviated inward, the line is thinned. An area where the amount of light does not reach the certain amount Th may occur inside the line image due to a misalignment. However, since such areas are very small and toner is likely to adhere to the areas due to scattering or the like, such areas barely cause a change of density. The line width of a line image is less affected by a misalignment in the beam position inside the line image but is dependent on the beam position of the laser beams that render the contour of the line image.

The image forming apparatus G corrects the gray level of each pixel by means of the beam corrector A3 so that the density difference due to the misalignment in the beam position of the laser beams is reduced.

Beam Corrector

Figure 6:
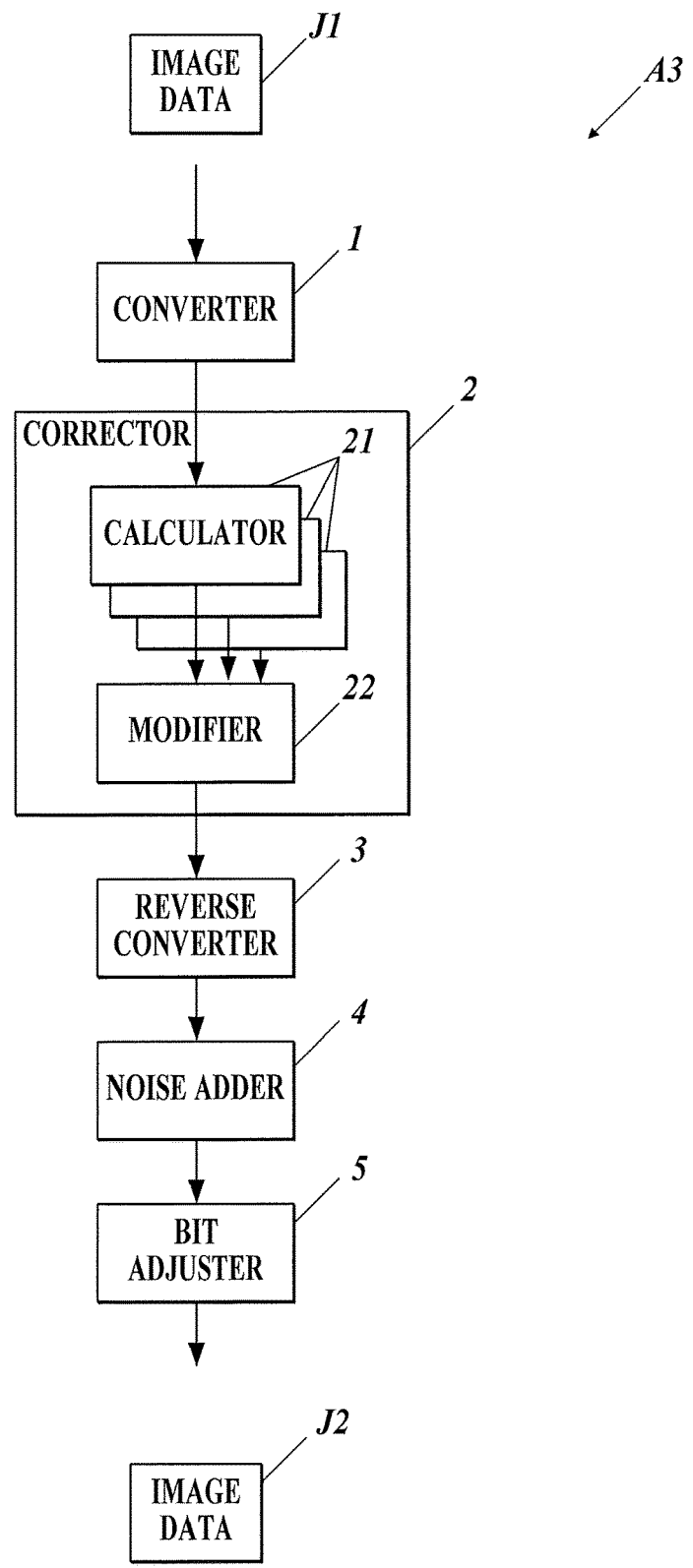
FIG. 6 is a block diagram illustrating the functional configuration of a beam corrector.

FIG. 6 illustrates the functional configuration of the beam corrector A3.

The beam corrector A3 corrects each pixel in image data J1 and outputs image data J2 composed of corrected pixels, in which a 1×5-pixel unit is input for correcting the pixel at the center. Each pixel in the image data J1, J2 has a 4-bit gray level ranging from 0 to 15. The input unit of the image data is generally referred to as an observation window, and the pixel at the center of an observation window is referred to as a target pixel.

As illustrated in FIG. 6, the beam corrector A3 includes a converter 1, a corrector 2, a reverse converter 3, a noise adder 4 and a bit adjuster 5.

The converter 1 converts the gray level of each input pixel from 4 bits to 9 bits. The bit extension enables fine adjustment of the gray level and improving the accuracy of the correction.

Along with the conversion for the bit extension, the converter 1 converts the gray level of each pixel so that the change of the gray level of the image data by the correction processing, which is described later, is approximately linear to the change of the density of the image formed on a sheet. The gray level conversion enables ensuring the one-to-one linear relationship between the change of correction values and the change of uneven density or line width (i.e. between the correction values and the density difference), which facilitates calculating suitable correction values. A look-up table (LUT) may be used for the conversion.

Figure 7:
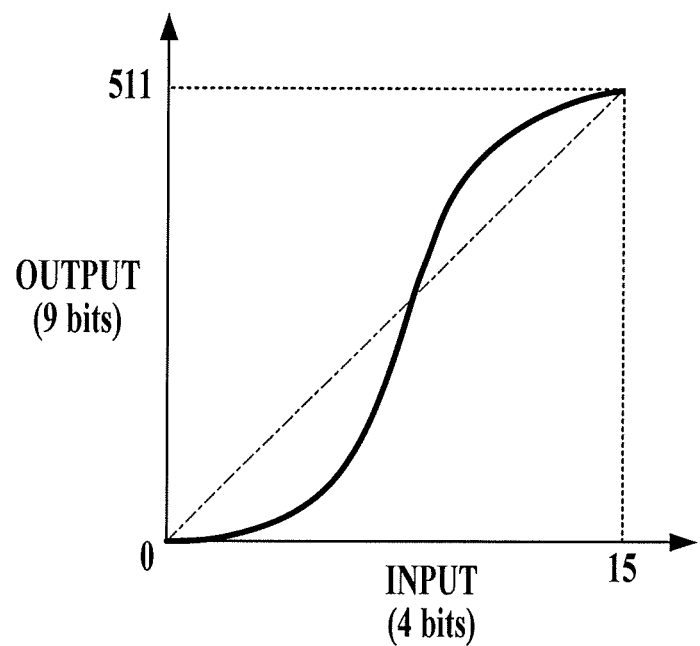
FIG. 7 illustrates the relationship between the input and output of a look-up table used for conversion of image data.

FIG. 7 illustrates an example of a 9-bit gray level output of an LUT to a 4-bit gray level input.

The LUT can convert the input gray level of each pixel from 4 bits to 9 bits as well as linearize the gray level so that the gray level has gradation characteristics of one-to-one correspondence between the correction value and the density difference to be corrected by the correction.

In order to prevent an overflow, which can occur when the corrector 2 increases the gray level in the correction, the converter 1 further adds the most significant bit to the converted 9-bit gray level so as to output the 10-bit gray level.

The corrector 2 corrects the gray level of the target pixel at the center of an input 1×5 pixels according to the deviation in the beam position of the laser beams.

As illustrated in FIG. 6, the corrector 2 includes three calculators 21 and a modifier 22.

From the input 1×5 pixels, the three calculators 21 respectively extract (i) the 1×3 pixels including the adjacent pixel in front of the target pixel (above the target pixel in FIG. 8 as described later) at the center, (ii) the 1×3 pixels including the target pixel at the center, and (iii) the 1×3 pixels including the adjacent pixel behind the target pixel (below the target pixel in FIG. 8 as described later) at the center. The three processors 21 calculate the corrected gray levels of the center pixels of the respective 1×3 pixels.

The modifier 22 modifies the corrected gray level of the target pixel by using the corrected gray levels of the target pixel and the adjacent pixels calculated by the calculators 21.

Figure 8:
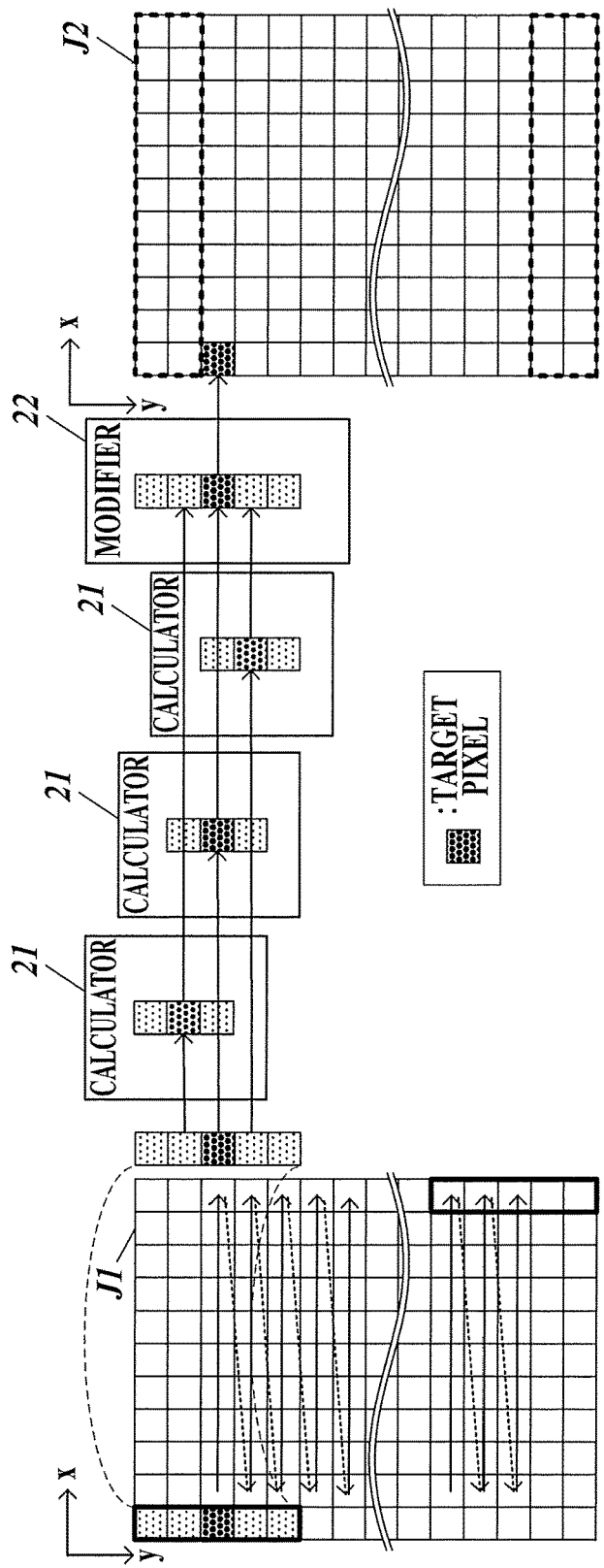
FIG. 8 illustrates a 1×5-pixel unit that is input for calculating corrected gray level.

FIG. 8 illustrates a 1×5 pixels, which is the input unit of the corrector 2.

As illustrated in FIG. 8, the corrector 2 repeats the input starting from the 1×5 pixels including the first pixel in the image data J1 until the 1×5 pixels including the last pixel as it shifts the 1×5-pixel observation window in increments of one pixel in the main scanning x direction, and when the window reaches the end of the main scanning x direction, by one pixel in the sub scanning y direction.

From the input 1×5 pixels, the calculators 21 extract the 1×3 pixels respectively centered at the target pixel and the adjacent pixels thereof and calculate the corrected gray levels of the target pixel and the adjacent pixels. The modifier 22 modifies the corrected gray level of the target pixel by using the corrected gray levels of the target pixel and the adjacent pixels calculated by the calculators 21, and outputs the modified target pixel as a pixel of the corrected image data J2. Since the pixel at the center of each 1×5 pixel unit is corrected as a target pixel, the end two lines at both ends in the sub scanning y direction of the corrected image data J2 are not corrected, and the original pixels are output as they are.

Calculation

Figure 9:
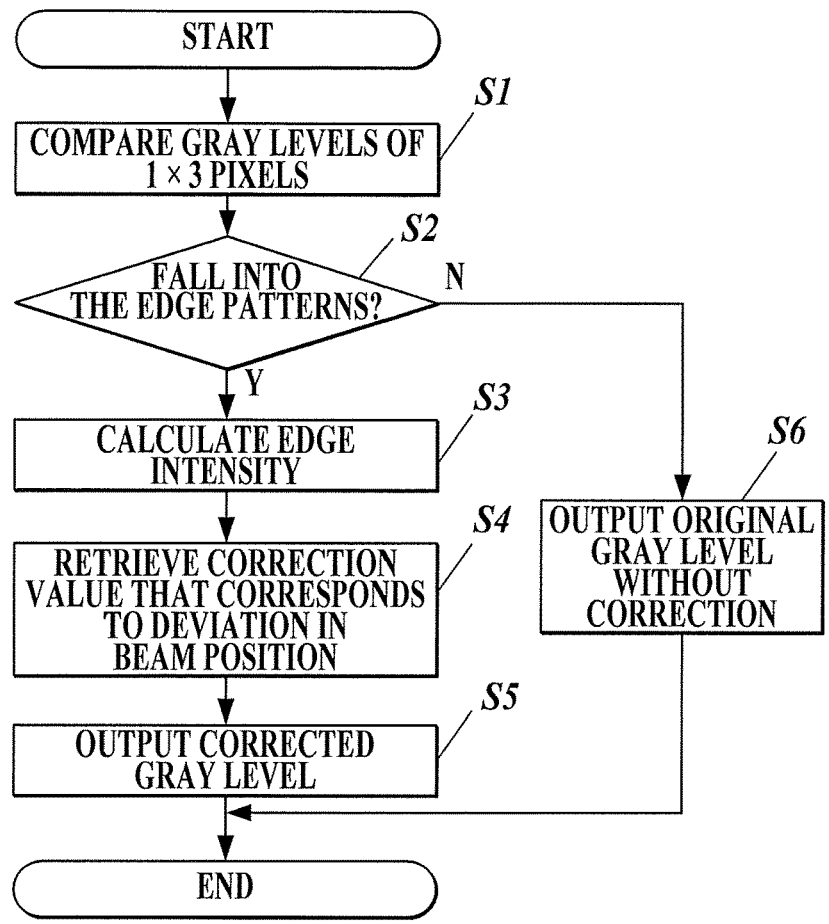
FIG. 9 is a flowchart of the process for calculating corrected gray level.

FIG. 9 illustrates the specific process performed by each of the calculators 21.

As illustrated in FIG. 9, the calculator 21 compare the gray levels of the input 1×3 pixels (Step S1).

When the compared gray levels fall into the edge pattern Pe1 or Pe2 as described below (Step S2, Yes), the calculator 21 detects an edge of an object including the center pixel of the 1×3 pixels as the contour pixel thereof and calculates the edge intensity ΔL of the edge (Step S3). As used herein, an object refers to a foreground image such as a text, a graphic or a photograph.

Figure 10:
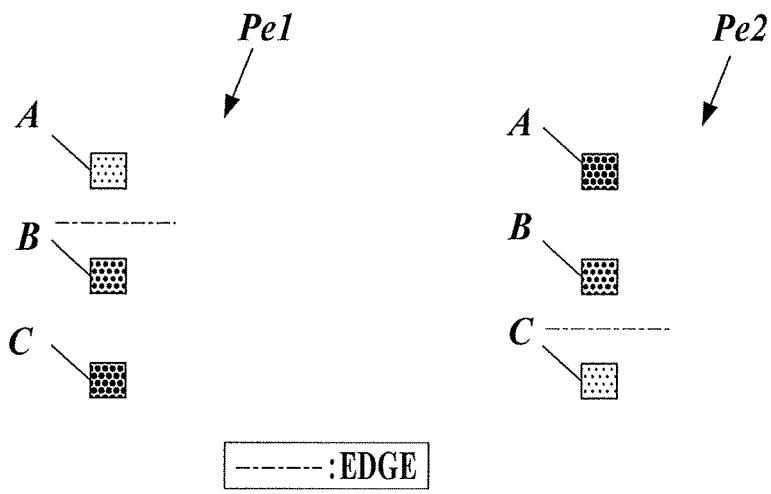
FIG. 10 illustrates edge patterns.

FIG. 10 illustrates the edge patterns Pe1, Pe2 of the 1×3 pixels.

As illustrated in FIG. 10, the edge pattern Pe1 satisfies $D(A)<D(B)\leq D(C)$, and the edge pattern Pe2 satisfies $D(C)<D(B)\leq D(A)$, where the gray levels of the pixels A to C of the 1×3 pixel are respectively $D(A)$ to $D(C)$. When the gray levels fall into the edge pattern Pe1, the edge is located between the pixel A and the pixel B. When the gray levels fall into the edge pattern Pe2, the edge is located between the pixel B and the pixel C. In both of the patterns Pe1, Pe2, the pixel B is a contour pixel of an object.

A misalignment in the beam position does not affect a line image with a line width of 1 pixel but is likely to cause a change of density in a line image with a line width of 2 pixels or more. The edge patterns Pe1 and Pe2 are patterns of the gray levels of two object pixels and one background pixel. By enabling the correction only when the gray levels fall into the edge pattern Pe1 or Pe2, images with a line width of 1 pixel can be excluded from the correction.

Since the edge intensity ΔL is the difference between the gray level of a contour pixel of an object and the gray level of a background pixel adjacent to the contour pixel, it can be calculated by the following equation (1) for the edge pattern Pe1 and the following equation (2) for the edge pattern Pe2.

$$\Delta L=|D(B)-D(A)| \qquad (1)$$

$$\Delta L=|D(B)-D(C)| \qquad (2)$$

Then, the calculator 21 specifies the beam position "n" of the laser beam that renders the pixel B at the center of the 1×3 pixels and retrieves a correction value w(n) corresponding to the deviation of the specified beam position "n" from the resistor or the like (Step S4). The correction value w(n) is determined as being proportional to the deviation of the beam position "n" of the laser beam from the reference position. The correction value w(n) is a positive or negative value. When the beam position "n" is deviated inward to the object, the correction value w(n) is positive value. When the beam position "n" is deviated toward the background, the correction value w(n) is a negative value.

The calculator 21 calculates the corrected gray level D*(B) of the pixel B at the center of the 1×3 pixels from the retrieved correction value w(n) and the edge intensity ΔL and outputs it (Step S5).

The calculator 21 can calculate the corrected gray level D*(B) of the pixel B at the center of the 1×3 pixels by the following equation (3).

$$D^*(B)=D(B)+w(n)\times\Delta L \qquad (3)$$

As illustrated in FIG. 5, the line width of an object depends on the beam position of the laser beams that render the contour pixels thereof. When the beam position is deviated toward the background of the line image, the line is bolded. On the contrary, when the beam position is deviated inward to the line image, the line is thinned. The higher the edge intensity ΔL, the larger the change of density due to the change of the line width. With the above-described equation (3), the correction value w(n) to be added to the original gray level D(B) can be adjusted so that the degree of correction is increased according to the edge intensity ΔL.

Figure 11:
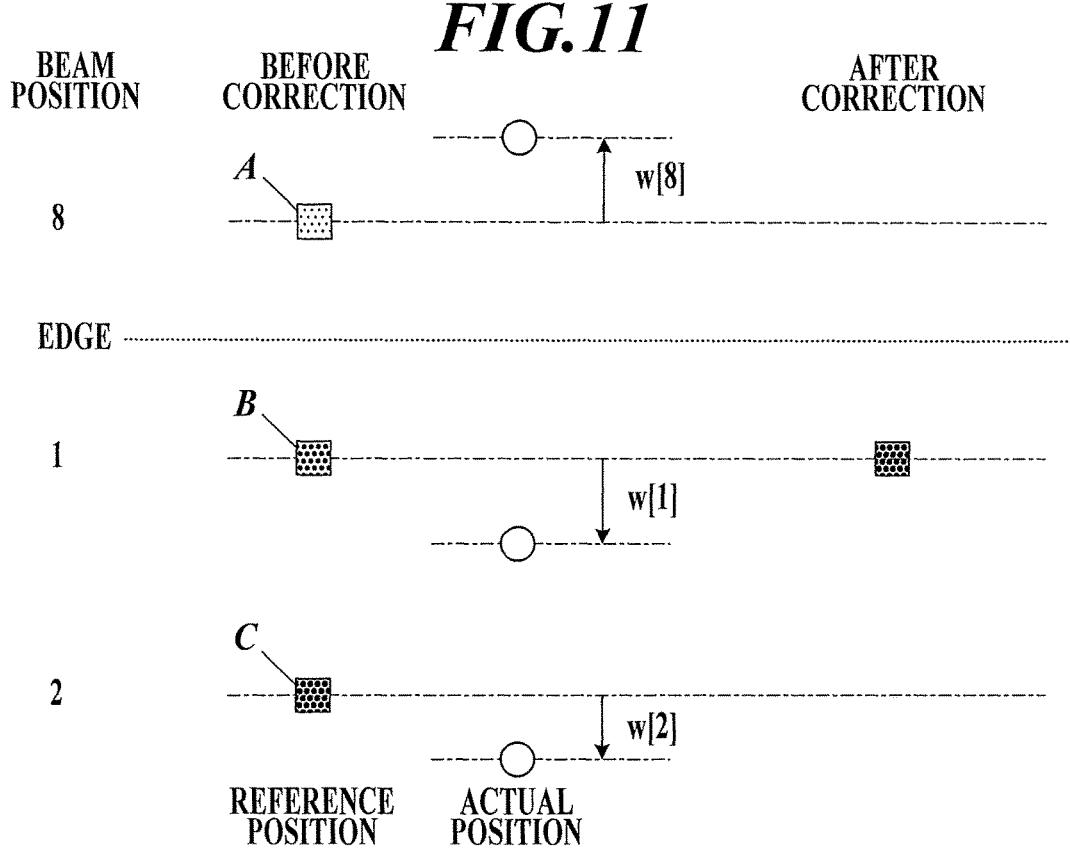
FIG. 11 illustrates correction values according to the deviation of laser beams and an example of the correction using the correction values.

FIG. 11 is an example of the correction when the gray levels of the pixels A, B, C fall into the edge pattern Pe1.

When they fall into the edge pattern Pe1, the pixels B, C are object pixels while the pixel A is a background pixel, and the edge is located between the pixel A and the pixel B.

When the beam position 1 of the laser beam that is modulated according to the gray level of the contour pixel B is deviated inward to the object from the reference position as illustrated in FIG. 11, the line width of the object is thinned.

In this case, the calculator 21 retrieves a positive correction value w(1), and the positive value obtained by multiplying the edge intensity ΔL to the positive correction value w(1) is added to the original gray level D(B). Accordingly, the gray level of the pixel B can be increased by the correction. As a result, the amount of light of the laser beam in the pixel B is increased, and the original line width can thus be reproduced.

On the contrary, when the beam position 1 of the laser beam that renders the contour pixel B is deviated toward the background from the reference position, the line width of the object is bolded. In this case, the calculator 21 retrieves a negative correction value w(1), and the negative value obtained by multiplying the edge intensity ΔL to the negative correction value w(1) is added to the original gray level D(B). Accordingly, the gray level of the pixel B can be decreased by the correction. As a result, the amount of light of the laser beam in the pixel B is decreased, and the original line width can thus be reproduced.

For example, the correction value w(n) that corresponds to the beam position "n" can be determined by forming a pattern by means of the image forming unit 18 in which diagonal lines are arranged at intervals of the integral multiple of the number of beams of a multibeam array, and measuring the line width of the diagonal lines of the formed pattern.

Figure 12:
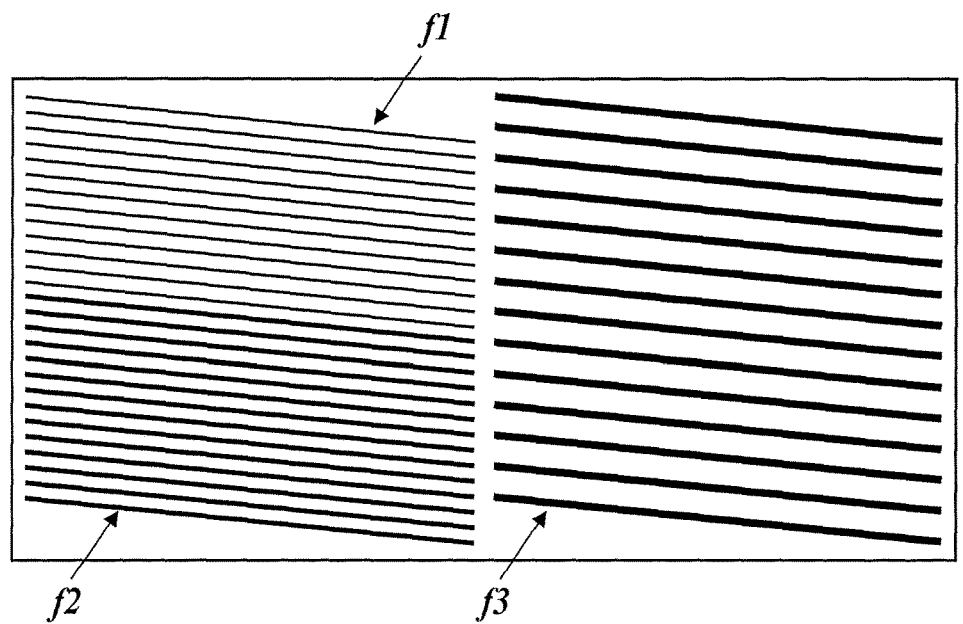
FIG. 12 illustrates examples of patterns that can be used to determine correction values.

FIG. 12 illustrates three patterns f1 to f3, which are examples of patterns that can be used to determine the correction value w (n).

The pattern f1 has a line width of the diagonal lines of 4 pixels and spacing between diagonal lines of 8 pixels which is equal to the number (8) of beams of the multibeam array.

The pattern f2 has a line width of the diagonal lines of 6 pixels and spacing between diagonal lines of 8 pixels which is equal to the number (8) of beams of the multibeam array.

The pattern f3 has a line width of the diagonal lines of 8 pixels and spacing between diagonal lines of 16 pixels which is equal to twice the number (16) of beams of the multibeam array.

As described above, when the spacing between the diagonal lines of the pattern is the integral multiple of the number of beams of the multibeam array, a periodical uneven density as illustrated in FIG. 4 is more recognizable.

While the correction value w(n) can be determined based on either one of the patterns, it is preferred to use a combination of patterns since the change of density due to a misalignment in the beam position can be determined relatively readily at high accuracy.

Since the line width of a diagonal line is proportional to the density of an area including the diagonal line, the density may be measured instead of the line width to determine the correction value w(n). It is preferred to measure the density since the correction value w(n) can be determined without high resolution scanning. To determine the density, the density in a certain area including a diagonal line can be measured as the average density. However, the measuring method is not limited thereto, and typical techniques to measure the overall density of an area including a diagonal line can be used.

To determine the correction value w(n), a pattern is formed by means of the image forming unit 18 without any correction, the characteristics of the change of the line width (or the density) of the diagonal lines are determined, and the correction values w(n) of the respective beams are determined based on the characteristics. After the pattern is corrected based on the determined correction values w(n) by means of the image processing apparatus GA, the corrected pattern is formed by means of the image forming unit 18. The characteristics of the change of the line width (or the density) of the diagonal lines are determined, and the correction values w(n) of the respective beams are modified based on the characteristics. The modification of the correction values w(n) can be repeated until the line width (or the density) of the corrected diagonal lines agrees with the original line width (or the original density) (or until the periodical uneven density becomes hardly recognizable or is minimized).

While the modification can be repeated to optimize the correction values w(n) as described above, some corrected patterns may be formed respectively with different sets of correction values w(n), and a set of correction values w(n) are selected that makes the line width (or the density) of the corrected diagonal lines closest to the original line width (or the density) (or that makes the periodical uneven density most unrecognizable).

When the gray levels fall into neither edge pattern Pe1 nor Pe2 (Step S2, No), the calculator 21 does not perform any correction but outputs the pixel at the center of the 1×3 pixels with the original gray level (Step S6).

According to the attribute of each pixel in image data, the calculators 21 can determine whether to correct the gray level to output the corrected gray level or to output the original gray level without any correction. The attribute of each pixel can be determined based on the attribute data that is generated along with the image data.

For example, the calculators 21 may exclude pixels with an attribute of photograph from the correction while including pixels with an attribute of text or graphic to the correction. It is sometimes difficult to detect an edge in an image area of a photograph since the contrast between the object and the background is unclear due to low-pass filtering or the like for removing the noise. Further, the correction is not very effective since there are less areas where the density of the object is flat and the density fluctuation due to a misalignment of the beam position is originally unnoticeable. Meanwhile, the correction may cause an unintentional fluctuation of density (e.g. when a local gray level difference that is generated by screening and is irrelevant to the original image, is recognized as an edge, since halftone photographs are often rendered by pseudo gradation processing such as screening). For these reason, image deterioration can be prevented when pixels with an attribute of photograph are excluded from the correction.

Modification

When the corrected gray level of a target pixel exceeds the maximum value, the modifier 22 cuts the excess to set the gray level to the maximum value. When the corrected gray level of an adjacent pixel adjacent to a target pixel across an edge exceeds the maximum value, the modifies 22 adds the excess to the gray level of the target pixel.

Specifically, among 1×5 pixels input to the corrector 2, the modifier 22 uses the corrected three pixels output from the respective calculators 21 for the center three pixels to reconstruct the 1×5 pixels as illustrated in FIG. 8. The two pixels at both ends of the reconstructed 1×5 pixels remain the same as the original. The modifier 22 compares the gray levels of the 1×5 pixels and makes a determination as to whether they falls into patterns to be modified.

Figure 13:
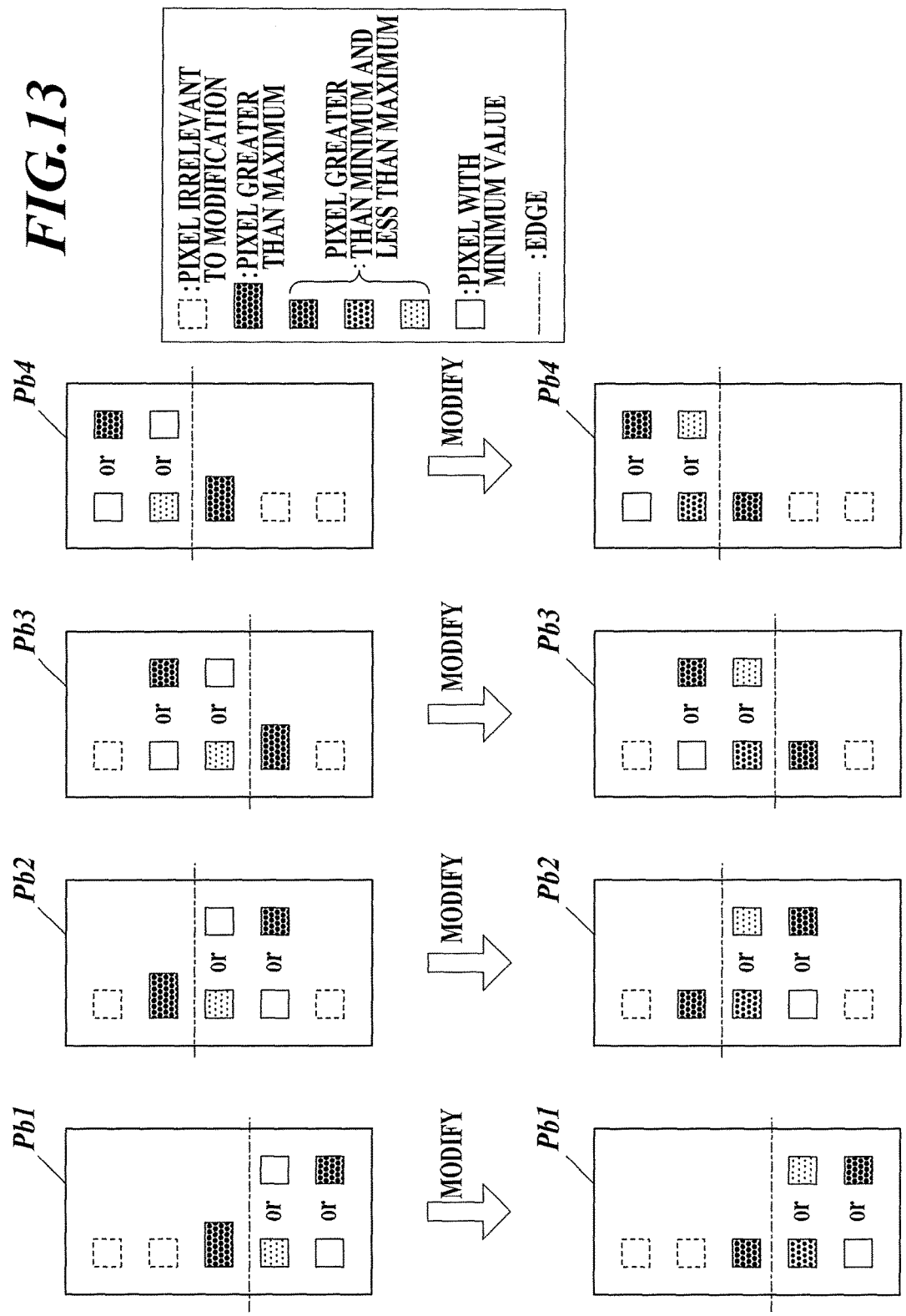
FIG. 13 illustrates patterns of corrected gray level to be modified.

FIG. 13 illustrates patterns Pb1 to Pb4 to be modified.

As illustrated in FIG. 13, the patterns Pb1 to Pb4 to be modified include a target pixel or the pixel adjacent to a target pixel across an edge that has a corrected gray level over the maximum value. The modifier 22 sequentially makes determinations as to whether the gray levels falls into the patterns Pb1, Pb2, Pb3 or Pb4 in the written order.

If the gray levels fall into any one of the patterns Pb1 to Pb4 to be modified, the modifier 22 modifies the corrected gray level of the target pixel and outputs it. As illustrated in FIG. 13, if the gray levels fall into the pattern Pb1 or Pb4 to be modified, the gray level of the target pixel exceeds the maximum value, and the modifier 22 cuts the excess of the gray level to set the gray level of the target pixel to the maximum value. If the gray levels fall into the pattern Pb2 or Pb3 to be modified, the gray level of the pixel adjacent to the target pixel across the edge exceeds the maximum value, and the modifier 22 adds the excess of the gray level to the gray level of the target pixel.

It may be configurable whether to perform the modification by the modifier 22.

For example, the modifier 22 may be configured to perform the modification in a normal condition but not to perform the modification when a favorable correction cannot be performed temporarily due to a significant change of the environment such as temperature or humidity.

The reverse converter 3 converts the gray level of each pixel corrected by the corrector 2 by using an LUT so that the converted gray level has the opposite gradation characteristics to the gray level converted by the converter 1. In the 10 bits of the gray level output from the corrector 2, the most significant bit is intended for an overflow. Since the overflow has been already eliminated by the modification by means of the modifier 22, the reverse converter 3 extracts the lower 9 bits from the 10 bits before the reverse conversion. When the modifier 22 does not perform the modification as described above, an overflown 10-bit gray level is passed to the reverse converter 3. The reverse converter 3 converts (clips) the overflown 10-bit gray level to the maximum 9-bit gray level and extracts the lower 9 bits before the reverse conversion.

Figure 14:
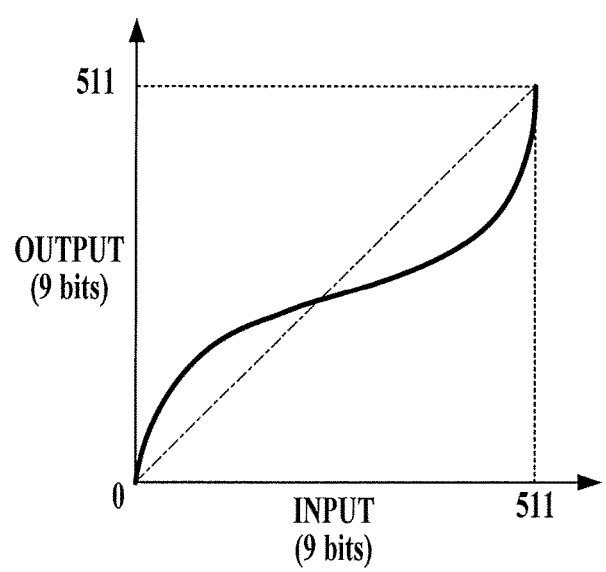
FIG. 14 illustrates the relationship between the input and output of a look-up table that is used for reverse conversion of image data.

FIG. 14 illustrates an example of the 9-bit gray level output of an LUT to the 9-bit gray level input.

This LUT can restore the relationship between an input gray level and an output gray level.

The noise adder 4 adds a noise by adding a 5-bit noise value to the 9-bit gray level of each pixel output from the reverse converter 3.

The noise addition enables reproducing a minute change of gray level caused by the addition of a correction value even when the bit number of the gray level is reduced after the correction.

When the noise addition may cause an overflow of a 9-bit gray level, the noise value may be added after the gray level is converted from 9 bits to 10 bits by adding the most significant bit. After the addition, the most significant bit is deleted, and the lower 9-bit gray level may be output.

The noise adder 4 may add the noise value by using a dither matrix. Specifically, the noise adder 4 provides a 32-pixel dither matrix in which each pixel has a 5-bit threshold ranging from 0 to 31 and adds the threshold values to the pixel values of the corresponding pixels in image data. It is preferred to use a dither matrix since the gradation can be reproduced as pseudo gradation.

When a dither matrix is used, it is preferred to suitably select the shape, size and the like of the dither matrix so that the Moire pattern due to an irregular beam spacing of the multibeam array does not interfere with the periodic dither matrix. For example, the size in the sub scanning direction of the dither matrix may be selected so that it is not equal to the integral multiple of the number of beams of the multibeam array. Further, a super cell, which is a combination of dither matrixes with different shapes and sizes, may also be used.

The noise adder 4 may retrieve different values output from a random number generator or the like and add them as noise values.

In order to avoid a visible fluctuation and to prevent deterioration of the graininess, the noise values are preferably based on a blue noise that is mainly composed of relatively high spatial frequency components.

The bit adjuster 5 shifts the 9-bit gray level of each pixel in image data output from the noise adder 4 to extract the upper 4 bits and outputs it.

As described above, the image forming apparatus G of the embodiment includes:

the beam corrector A3 that corrects the gray level of each pixel in image data so as to reduce the density difference due to a misalignment in the beam position of the laser beams of the multibeam array; and the image forming unit 18 that scans the photoreceptors with modulated multiple beams according to the gray level of each pixel corrected by the beam corrector A3 so as to exposes multiple lines in parallel.

The beam corrector A3 includes the calculators 21 that detect the edge of an object between a pixel and the adjacent pixels thereof in the image data and calculate the edge intensity of the edge. The calculators 21 calculate the corrected gray level of the pixel by using the calculated edge intensity and the correction values corresponding to the deviation of the beam position of the laser beams that are emitted according to the gray level of the pixel.

Since the corrected gray level of each pixel is calculated by sequentially setting each pixel as a target pixel and detecting an edge between the target pixel and the adjacent pixels thereof, it is not necessary to change the correction process according to whether the target pixel is a contour pixel of an object. Therefore, the correction is made stably with a uniform process.

Further, since not only the deviation in the beam position of the laser beams but also the edge intensity having a large influence on the density fluctuation is used to calculate the corrected gray level, the accuracy of the correction is improved.

Variation 1

The laser scanning beams may sometimes not be aligned in a horizontal line but in a curved or inclined line due to a distortion of the optical system such as the cylindrical lens 36 or the like, a distortion of the mirror surface of the polygon mirror 34 or decentering. In such cases, the calculators 21 may adjust the correction values according to not only the beam position of the laser beams but also the position in the main scanning direction so as to reduce the inaccuracy of the correction related to the position in the main scanning direction.

Figure 15:
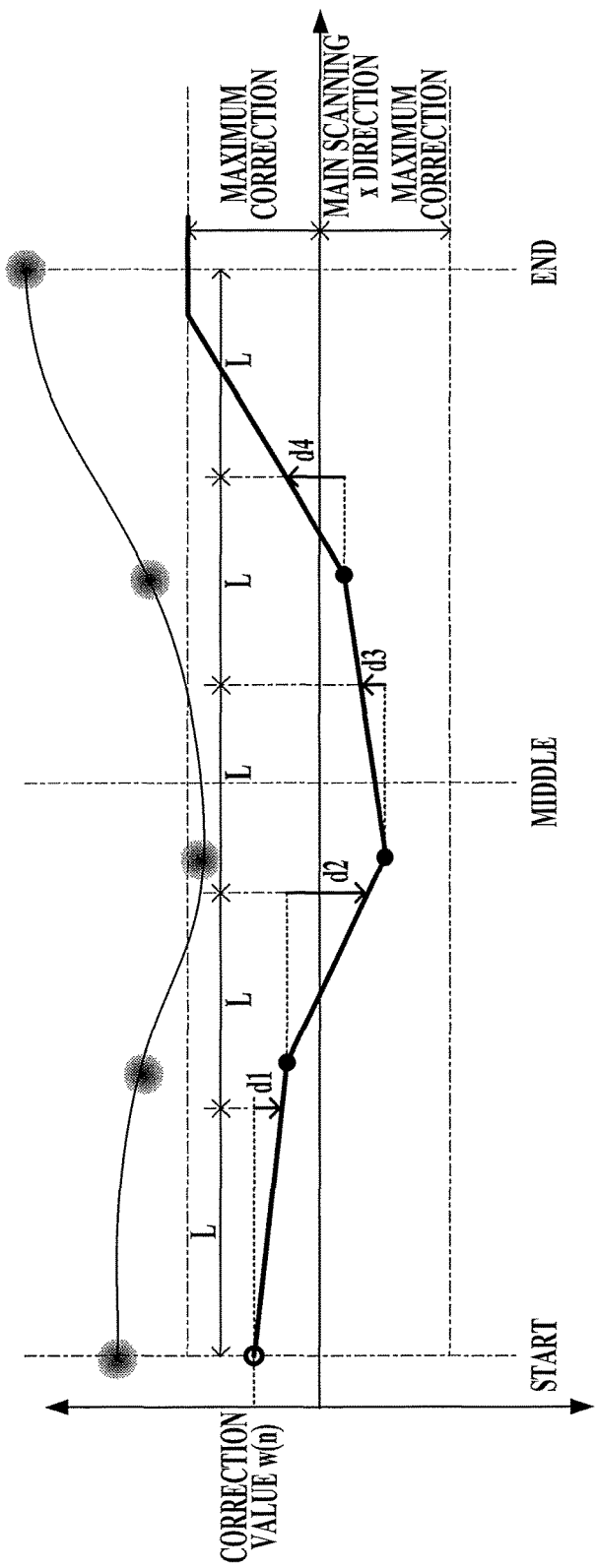
FIG. 15 illustrates an example of adjustment of correction values according to the position in the main scanning direction.

FIG. 15 illustrates an example of the adjustment of the correction values according to the position in the main scanning direction.

As illustrated in FIG. 15, as the laser beams shift L pixels in the main scanning x direction, the calculators 21 can adjust the correction value w(n) by sequentially adding adjustment values d1 to d4 to the initial value corresponding to the beam position "n". The adjustment values d1 to d4 are determined within the range of a maximum correction value according to the inclination of the scanning laser beams. The three inflection points for determining the inclination may be suitably set. When the correction value w(n) exceeds the maximum correction value as a result of adding the adjustment values d1 to d4, the correction value w(n) is set to the maximum correction value. In FIG. 15, the adjustment values d1, d2 illustrated by the down arrows are negative values that decrease the correction value w(n). The adjustment values d3, d4 illustrated by the up arrows are positive values that increase the correction value w(n).

In the embodiment, three inflection points and the change (inclination) of the correction values between them are used to adjust the correction values according to the position in the main scanning direction. However, the present invention is not limited thereto. For example, the position of the inflection points and the correction values at the start and the end in the main scanning x direction may be stored, and the correction values at the intermediate point may be calculated from the correction values at the adjacent points by linear interpolation.

Since the inclination of the laser scanning beams differs depending on the mirror surfaces of the polygon mirror 34, the correction values may be adjusted with respect to each of the mirror surfaces.

Figure 16:
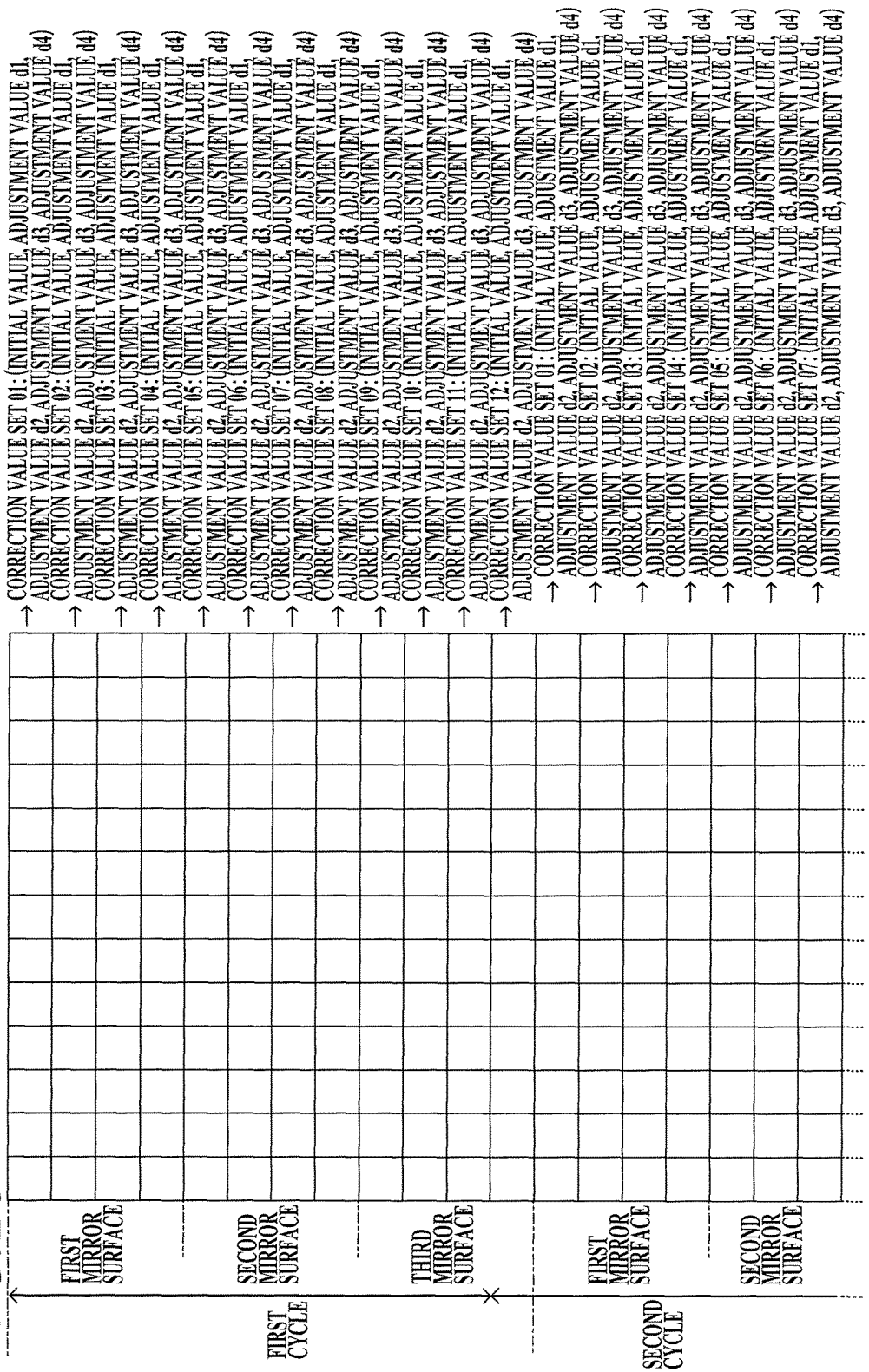
FIG. 16 illustrates an example of adjustment of correction values with respect to each mirror surface of a polygon mirror.

FIG. 16 illustrates an example of the adjustment of the correction values in which the multibeam array is composed of four laser beams and the polygon mirror has three mirror surfaces.

As illustrated in FIG. 16, for a mirror surface 1, correction value sets 01 to 04 are set respectively for the four laser beams. Similarly, for a mirror surface 2 and a mirror surface 3, correction value sets 05 to 08 and correction value sets 09 to 12 are set respectively. Each of the correction value sets 01 to 12 includes an initial value of the correction value w(n) based on the beam position "n" of the corresponding laser beam and adjustment values d1 to d4 to be added to the initial value.

After the first cycle of scan with the first to third mirror surfaces, the correction value sets 01 to 12 for the first to third mirror surfaces can be used similarly in the second and later cycles.

The above-described embodiment is merely a suitable example of the present invention, and the present invention is not limited thereto. Suitable changes can be made within the present invention.

For example, the hardware processor 11 may read a program to perform the above-described process instead of the beam corrector A3. Further, instead of the image forming apparatus G, a computer such as a universal PC may read the program to perform the above-described process.

Non-volatile memories such as a ROM and a flash memory and portable recording media such as a CD-ROM are applicable as the computer-readable medium of the program. Carrier wave is also applicable as a medium for providing data of the program through a communication line.

Although embodiments of the present invention have been described and illustrated in detail, it is clearly understood that the same is by way of illustration and example only and not limitation, the scope of the present invention should be interpreted by terms of the appended claims.

Japanese patent application No. 2016-179180 filed on Sep. 14, 2016, including description, claims, drawings, and abstract the entire disclosure is incorporated herein by reference in its entirety.

What is claimed is:

1. An image processing apparatus, comprising:
a beam corrector which corrects a gray level of each pixel in image data so as to reduce a density difference due to a misalignment in beam position of laser beams of a multibeam array,
wherein the beam corrector comprises a calculator which detects an edge of an object between a pixel and adjacent pixels of the pixel in the image data and calculates an edge intensity of the edge, and
wherein the calculator calculates a corrected gray level of the pixel from the calculated edge intensity and a correction value corresponding to a deviation in beam position of the laser beams emitted according to a gray level of the pixel.

2. The image processing apparatus according to claim 1, wherein the beam corrector further comprises:
a converter which converts the gray level of the pixel before the calculator calculates the corrected gray level, in which the converter coverts the gray level so that the gray level has gradation characteristics of one-to-one correspondence between the correction value and the density difference; and
a reverse converter which converts the corrected gray level after the calculator calculates the corrected gray level, in which the reverse converter converts the gray level so that the corrected gray level has reverse characteristics of the gradation characteristics imparted by the converter.

3. The image processing apparatus according to claim 1, wherein the beam corrector further comprises a modifier,
wherein when the corrected gray level of the pixel exceeds a maximum value of a gray level, the modifier cuts an excess to set the corrected gray level of the pixel to the maximum value, and
wherein when a corrected gray level of one of the adjacent pixels which is adjacent to the pixel across the edge exceeds the maximum value, the modifier adds an excess to the corrected gray level of the pixel.

4. The image processing apparatus according to claim 1, wherein the beam corrector further comprises a noise adder which adds a noise value to the corrected gray level.

5. The image processing apparatus according to claim 1, wherein the calculator adjusts the correction value to be used for calculating the corrected gray level according to a position of the pixel in a main scanning direction.

6. The image processing apparatus according to claim 1, wherein, according to an attribute of the pixel in the image data, the calculator determines whether to correct the gray level to output the corrected gray level or to output the original gray level without correcting the gray level.

7. An image forming apparatus, comprising:
a beam corrector which corrects a gray level of each pixel in image data so as to reduce a density difference due to a misalignment in beam position of laser beams of a multibeam array;
an image forming unit which emits modulated multiple beams of the multibeam array according to a corrected gray level of each pixel corrected by the beam corrector to scan a photoreceptor so as to expose multiple lines in parallel,
wherein the beam corrector comprises a calculator which detects an edge of an object between a pixel and adjacent pixels of the pixel in the image data and calculates an edge intensity of the edge, and
wherein the calculator calculates a corrected gray level of the pixel from the calculated edge intensity and a correction value corresponding to a deviation in beam position of the laser beams emitted according to a gray level of the pixel.

8. The image forming apparatus according to claim 7, wherein the beam corrector further comprises:
a converter which converts the gray level of the pixel before the calculator calculates the corrected gray level, in which the converter coverts the gray level so that the gray level has gradation characteristics of one-to-one correspondence between the correction value and the density difference; and
a reverse converter which converts the corrected gray level after the calculator calculates the corrected gray level, in which the reverse converter converts the gray level so that the corrected gray level has reverse characteristics of the gradation characteristics imparted by the converter.

9. The image forming apparatus according to claim 7, wherein the beam corrector further comprises a modifier,
wherein when the corrected gray level of the pixel exceeds a maximum value of a gray level, the modifier cuts an excess to set the corrected gray level of the pixel to the maximum value, and
wherein when a corrected gray level of one of the adjacent pixels which is adjacent to the pixel across the edge exceeds the maximum value, the modifier adds an excess to the corrected gray level of the pixel.

10. The image forming apparatus according to claim 7, wherein the beam corrector further comprises a noise adder which adds a noise value to the corrected gray level.

11. The image forming apparatus according to claim 7, wherein the calculator adjusts the correction value to be used for calculating the corrected gray level according to a position of the pixel in a main scanning direction.

12. The image forming apparatus according to claim 7, wherein, according to an attribute of the pixel in the image data, the calculator determines whether to correct the gray level to output the corrected gray level or to output the original gray level without correcting the gray level.

13. A non-transitory computer-readable medium storing a program causing a computer to perform:
correcting a gray level of each pixel in image data so as to reduce a density difference due to a misalignment in beam position of laser beams of a multibeam array,
wherein the correcting comprises:
detecting an edge of an object between a pixel and adjacent pixels of the pixel in the image data and calculating an edge intensity of the edge; and
calculating a corrected gray level of the pixel from the calculated edge intensity and a correction value corresponding to a deviation in beam position of the laser beams emitted according to a gray level of the pixel.

14. The computer-readable medium according to claim 13, wherein the correcting further comprises:
converting the gray level of the pixel before calculating the corrected gray level, in which the gray level is converted to have gradation characteristics of one-to-one correspondence between the correction value and the density difference; and
converting the corrected gray level after calculating the corrected gray level, in which the gray level is converted to have reverse characteristics of the gradation characteristics imparted by the converting before calculating the corrected gray level.

15. The computer-readable medium according to claim 13, wherein the correcting further comprises:
cutting an excess to set the corrected gray level of the pixel to a maximum value of a gray level when the corrected gray level of the pixel exceeds the maximum value; and
adding an excess to the corrected gray level of the pixel when a corrected gray level of one of the adjacent pixels which is adjacent to the pixel across the edge exceeds the maximum value.

16. The computer-readable medium according to claim 13, wherein the correcting further comprises:
adding a noise value to the corrected gray level.

17. The computer-readable medium according to claim 13, wherein in the calculating, the correction value to be used for calculating the corrected gray level is adjusted according to a position of the pixel in a main scanning direction.

18. The computer-readable medium according to claim 13, wherein in the calculating, whether to correct the gray level to output the corrected gray level or to output the original gray level without correcting the gray level is determined according to an attribute of the pixel in the image data.

* * * * *